(No Model.) 2 Sheets—Sheet 1.
A. W. CASH.
PRESSURE REGULATOR.
No. 534,951. Patented Feb. 26, 1895.
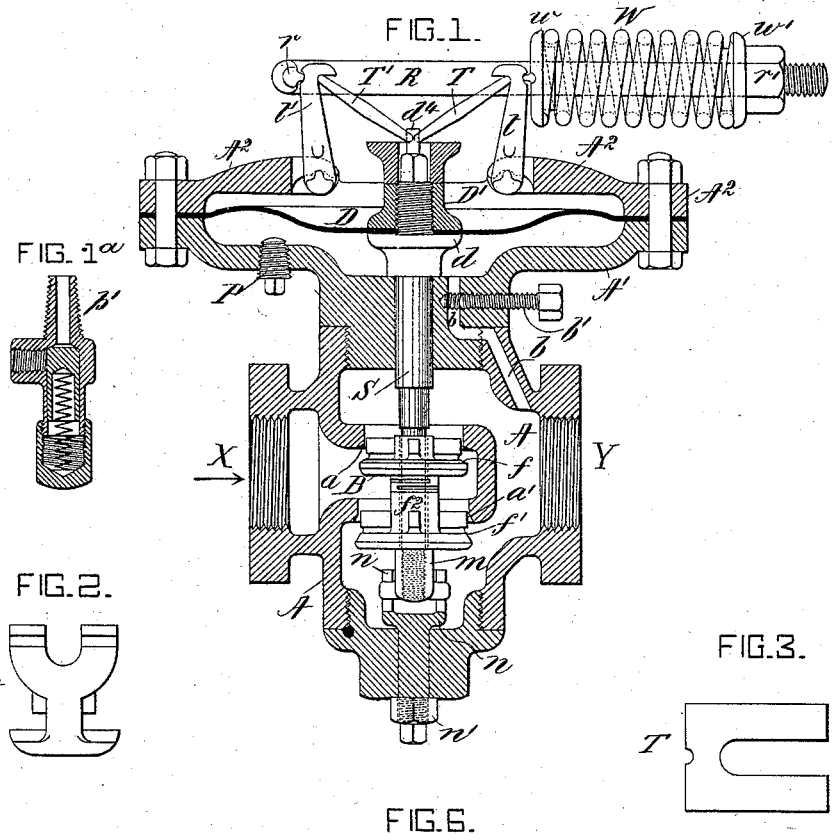
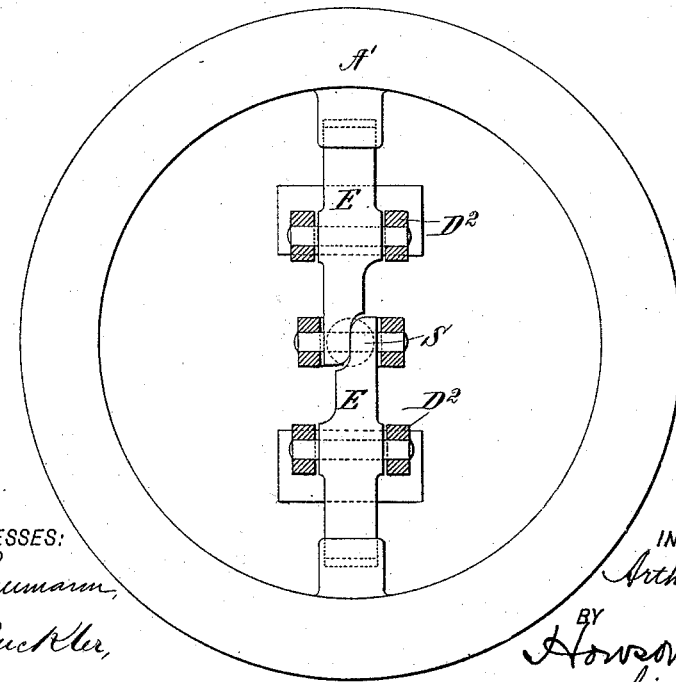
WITNESSES:
George Baumann,
John Buckler,
INVENTOR
Arthur W. Cash
BY Howson & Howson
his ATTORNEYS.

(No Model.) 2 Sheets—Sheet 2.
A. W. CASH.
PRESSURE REGULATOR.
No. 534,951. Patented Feb. 26, 1895.
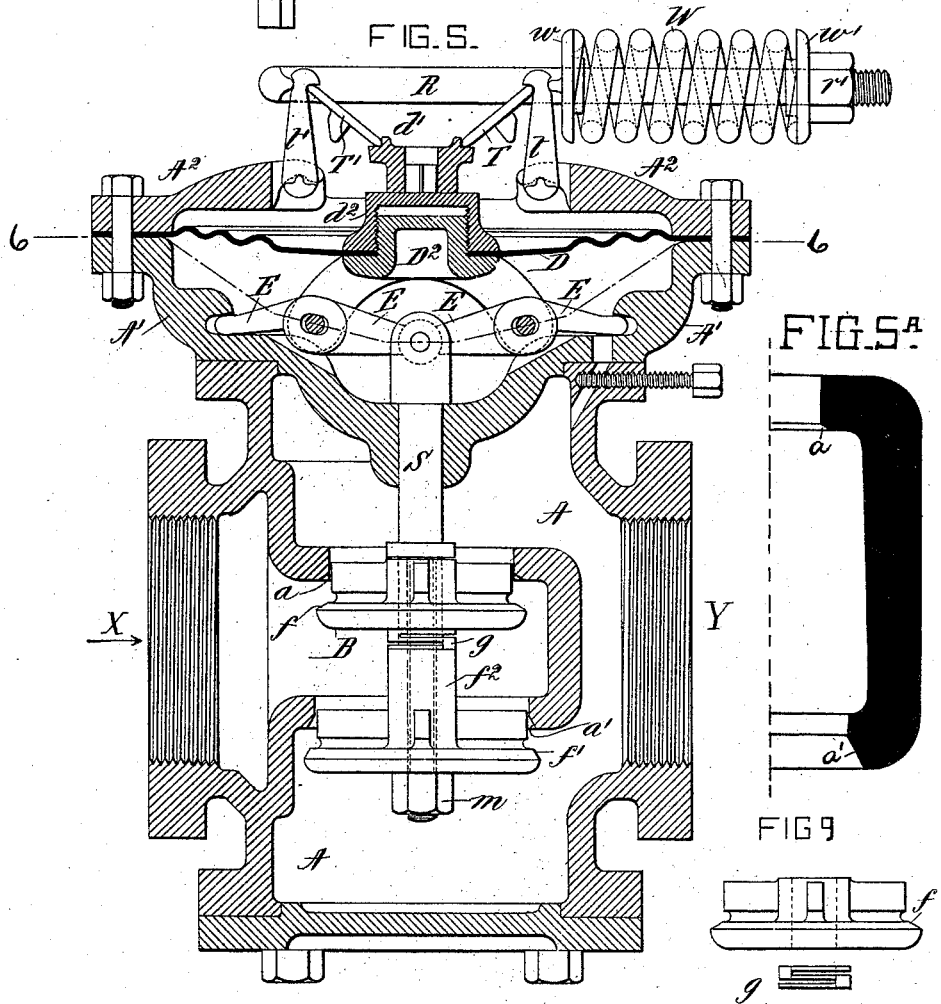
WITNESSES:
George Baumann
John Buckler
INVENTOR
Arthur W. Cash
BY
Howson & Howson
his ATTORNEYS.

UNITED STATES PATENT OFFICE.

ARTHUR W. CASH, OF NEWARK, NEW JERSEY, ASSIGNOR TO THE FOSTER ENGINEERING COMPANY, OF SAME PLACE.

PRESSURE-REGULATOR.

SPECIFICATION forming part of Letters Patent No. 534,951, dated February 26, 1895.

Application filed September 20, 1894. Serial No. 523,592. (No model.)

*To all whom it may concern:*

Be it known that I, ARTHUR W. CASH, a citizen of the United States, and a resident of Newark, Essex county, New Jersey, have invented Improvements in Automatic Pressure-Regulators and Pump-Governors, of which the following is a specification.

My invention relates to that class of pressure regulators and governors in which the movement of the valve controlling the pressure supply is itself controlled by the delivery pressure of the fluid acting upon a diaphragm or piston against the action of a spring or weight.

The main objects of my invention are to compensate for the changing power of the counteracting spring under its varying conditions of compression, to insure a tight seating of the balanced valve under varying temperatures, to permit of repairs to the diaphragm without detaching the regulator or cutting off the pressure supply to permit the grinding and fitting of such valve without the need of special skill or special tools, to avoid the use of large diaphragms in large regulators, to provide means for preventing an accumulation of excessive fluid pressure under the diaphragm, and finally to adapt the regulator to be used as a pump governor where desired.

In the accompanying drawings, Figure 1 is a vertical section of a regulator constructed in accordance with my invention. Fig. 1ª is a view of an attachment which may be employed. Figs. 2, 3 and 4 are views of details. Fig. 5 is a vertical section of a modified form of valve. Fig. 5ª, is a diagram drawn to a larger scale to illustrate the angles of the valve seats. Fig. 6 is a sectional plan view of the same on the line 6—6, Fig. 5. Figs. 7 and 8 are views of details; and Fig. 9 is a view of the parts of the balanced valve detached.

While my invention is applicable to the construction of regulators in which either a diaphragm or a piston is used to control the valve, I will here show and describe it as provided with a diaphragm, which I prefer, but it will be understood that by the use of the term "diaphragm" in the following description and claims, I do not exclude the use of a piston except where I specifically limit the term "diaphragm" by qualifying the adjective "flexible."

The body of the regulator comprises the valve casing proper A with an upper dish-shaped casing A', suitably mounted upon or forming part of the valve casing. The latter has an inlet X and outlet Y and has seats $a$ $a'$ for the balanced valve B, which is carried by the spindle S. This passes through the dish-shaped casing A' with a close fit of such a character as to prevent any appreciable amount of steam or other fluid pressure from passing through, while permitting the spindle to move therein. In the construction shown in Fig. 1, the upper end of the spindle is secured to the center of the flexible diaphragm D by the clamping of the diaphragm between a shoulder $d$ on the spindle and a screw nut D' threaded onto the upper threaded end of the spindle. The outer rim of the diaphragm is clamped to the outer rim of the dished casing A' by an open cover $A^2$ bolted to the casing A'. Communication is had between the interior of the valve chamber and the diaphragm chamber, that is,—the space within the casing A' below the diaphragm, through a port $b$, the opening of which is controlled by a screw $b'$. It is through this port that the reduced or regulated fluid pressure passing through the valve has access to the diaphragm to act thereon and by throttling this port with the screw "chattering" of the valve any violent vibration of the diaphragm can be prevented.

If while the regulator is in use, the diaphragm, spring, or any of the connecting parts should receive an injury, the closing of the port $b$ by the screw $b'$ will shut off the pressure from the diaphragm chamber without disturbing the flow of fluid through the valve. To act against this fluid pressure upon the under side of the diaphragm, there is provided a counteracting compression spring W, which is located outside of the pressure chamber so that it cannot be affected by the high temperature of the fluid which would otherwise have a tendency to alter the tension of said spring and to compensate for the variations in the powers of this spring under its varying degrees of compression, I provide the following construction: Upon the upper side of the diaphragm, there is mounted a loose bearing piece $d^4$ supporting the adjacent ends of the toggle levers T, T' (Figs. 1 and 3). The outer end of one toggle T acts indirectly against one end of the spiral spring W, while the outer end of the other toggle lever acts indirectly against the T-head $r$ of a rod R (Fig. 4) which carries the spring. The opposite ends of the spring are provided with bearing washers $w$ $w'$ loose upon the rod R and in contact with one of these washers $w'$ is a nut $r'$ adjustable on the threaded end of the rod R to adjust the tension of the spring. The outer face of the other washer is provided with bearing edges for the upper end of the supporting link $t$ which is shown as interposed between the end of the toggle lever T and the spring, while the lower end of the said link finds a bearing in the open cover $A^2$. A similar link $t'$ also finding its bearing in the cover $A^2$ has its upper end interposed between the toggle lever T' and the T-head of the rod R. These links, together with the toggle levers thus support the rod R and spring W, which are shown arranged in a horizontal position over the regulator. From this explanation it will be readily seen that as the diaphragm rises under an increase of the fluid pressure to close the valve, the toggle levers T, T will tend toward getting into a straight line with each other, compressing the spring W, but as the leverage of the toggles will increase and compensate for the increasing power of the spring due to its increasing compression, the power exerted in opposition to the fluid pressure will remain practically constant.

Instead of having the inner ends of the toggle levers near together, the bearing piece upon the diaphragm may be constructed as shown at $a'$ in the modification, Fig. 5, with the inner ends of the toggle levers T T' some distance apart. In this modification I have shown a construction whereby large valves may be provided with diaphragms, which are not abnormally large. I interpose between the upper end of the spindle S of the valve and the under side of the diaphragm, reducing levers E, E. The diaphragm D is clamped between a post or bracket $D^2$ and a cap $d^2$, and to this post or bracket, which is shown in under side view in Fig. 7, are pivoted the two levers E with pin and slot connections, as illustrated in Fig. 5. The outer ends of these levers find bearings on the casing A' in pockets provided for them. The inner ends of the levers E are pivoted to the upper end of the spindle (Figs. 5 and 6) so that for a given lift of valve spindle the lift of the diaphragm will be reduced one-half, and consequently the diaphragm may be proportionately smaller for that size of valve.

One great difficulty in these regulators in which balanced valves are used has been to get the two clappers to fit to their seats under varying conditions of temperature. It is usual to hold the double valve upon the spindle S with a nut $m$ and to fit the valve loosely on the spindle, as indicated by dotted lines in Fig. 1, so that the valves will accommodate themselves to their seats if the spindle be not quite in the center, but this does not meet the difficulty that although the two valves may be truly fitted to their seats under one temperature, one of the valves, owing to expansion and contraction, will not close properly to its seat when the other does, under a different temperature. To meet this difficulty I make the inclined bearing face of one valve and its seat at a different angle from that of the other. Thus, as shown in Figs. 1, 5 and 9, the upper valve has its inclined bearing face $f$ at a relatively acute angle to the bottom of the valve while the inclined bearing face $f'$ of the lower valve is relatively obtuse. The diagram Fig. 5$^a$, illustrating the seats on one side, is drawn to a larger scale to show the relative angles of the two seats more clearly. Owing to the acute angle of the bearing face of the upper valve, the latter can expand under heat diametrically without forcing the lower valve and intermediate shank $f^2$ downward to an excessive degree, while the lower valve having an obtuse angled bearing-face, its diametrical expansion compensates for longitudinal expansion of the shank $f^2$.

In order to facilitate the fitting of the valves to their seats, particularly after re-grinding, I make the two valves in two parts, as will be seen more clearly on reference to Fig. 9, the upper valve being sleeved with a tight fit upon a reduced extension of the shank $f^2$, and an intermediate spring washer $g$ being interposed. Thus each disk may be ground separately without special tools or the need of special skill, and when the valves are to be put back, the upper valve is placed on the shank a little high, and then both valves are forced to their bearings by a blow from a hammer and are thus maintained at a fixed distance apart.

In some cases it may be convenient to fit the retaining nut $m$ for the valves with wings or projections embraced by the forked upper end of a stem $n$, passing through the bottom of the valve casing, as shown in Fig. 1. Upon loosening the jam nut $n'$, the stem $n$ can be turned to turn the nut $m$ upon the threaded end of the valve spindle S to set the valves up.

I fit into the casing A' a threaded plug P (Fig. 1), in order that when it is desired to use the regulator as a pump governor, this plug may be removed and a pipe connection from the water pressure from the pump fitted into its place. Then upon closing the passage $b$ for the steam, and admitting the water pressure to the under side of the diaphragm, the water pressure from the pump can be made to automatically govern the supply of motive fluid pressure to the pump admitted through the regulator valve as will be readily understood.

As a safeguard against accident from excess of pressure on the delivery side of the valve due to possible leakage past the valve when closed, I provide on the diaphragm chamber a safety or relief valve P', (Fig. 1ª) which will take the place of the threaded plug P, Fig. 1. This relief valve will not only prevent accumulation of pressure but will give warning to the engineer of a leak.

I claim as my invention—

1. A regulator having a flexible diaphragm and valve chamber containing the regulating valve mechanically connected with the diaphragm, and a chamber between the valve chamber and diaphragm for the reception of the fluid to act upon the diaphragm, in combination with a spring to counteract the fluid pressure on the diaphragm, and means for adjusting the spring, a port directly in the casing between and connecting the diaphragm chamber and valve chamber, and means controlled from the outside for restricting or closing the said port, substantially as described.

2. A regulator having a diaphragm and a chamber for the fluid pressure to act on the diaphragm in combination with a valve chamber containing the regulating valve mechanically connected with the diaphragm, a closable port connecting the valve chamber with the diaphragm chamber, means controlled from the outside for closing said port, and a connection for a pipe from a pump to the interior of the diaphragm chamber, substantially as and for the purpose described.

3. A regulator having a flexible diaphragm, a chamber for the fluid pressure to act on the diaphragm, a valve spindle passing through the casing of said chamber with a close fit and connected to said diaphragm, a spring to counteract the fluid pressure on the diaphragm and means for adjusting the spring in combination with the valve chamber containing the regulating valve on said spindle and a closable port directly in the casing between and connecting the valve chamber with the diaphragm chamber, the latter chamber being between the valve chamber and diaphragm, and means controlled from the outside for restricting or closing said port, substantially as described.

4. A regulator having a valve and a diaphragm with a pressure chamber on one side thereof, said diaphragm being subjected to the action of the delivery pressure and controlling said valve, in combination with a counteracting spring located outside of the pressure chamber and toggle joint levers between the spring and diaphragm, substantially as and for the purpose set forth.

5. A regulator having a valve and a diaphragm subjected to the action of delivery pressure and controlling the valve in combination with a rod carrying the counteracting spring supporting links for the rod and spring and toggle levers between the diaphragm and the rod and spring, substantially as and for the purpose set forth.

6. A regulator having a valve chamber containing the regulating valve, a spindle carrying the valve, a diaphragm adapted to be subjected to the action of the delivery pressure and reducing levers connecting the valve spindle with the diaphragm, whereby the movement of the diaphragm may be relatively smaller than the movement of the valves, and relatively large valves may have diaphragms of small diameter, as and for the purpose set forth.

7. A regulator having a diaphragm adapted to be subjected to the action of the delivery pressure and a valve chamber having seats for a double valve in combination with a balanced valve controlled by the said diaphragm, the said balanced valve having its two clappers with bearing faces at different angles, substantially as described, whereby the diametrical expansion of one clapper will compensate for longitudinal expansion of the connecting shank between the clappers to insure tight bearings on the seats of both.

8. A regulator having a diaphragm adapted to be subjected to the action of the delivery pressure, in combination with a valved chamber containing a balanced regulating valve with its two clappers separable from each other, and normally maintained a fixed distance apart, with an interposing spring washer between said clappers, in combination with the valve chamber having seats for the valves, substantially as described.

In testimony whereof I have signed my name to this specification in the presence of two subscribing witnesses.

ARTHUR W. CASH.

Witnesses:
EDITH J. GRISWOLD,
HUBERT HOWSON.